Feb. 19, 1952   J. L. HART   2,586,649
RECOVERY OF INDIUM VALUES AS INDIUM ARSENATE
Filed Feb. 4, 1948
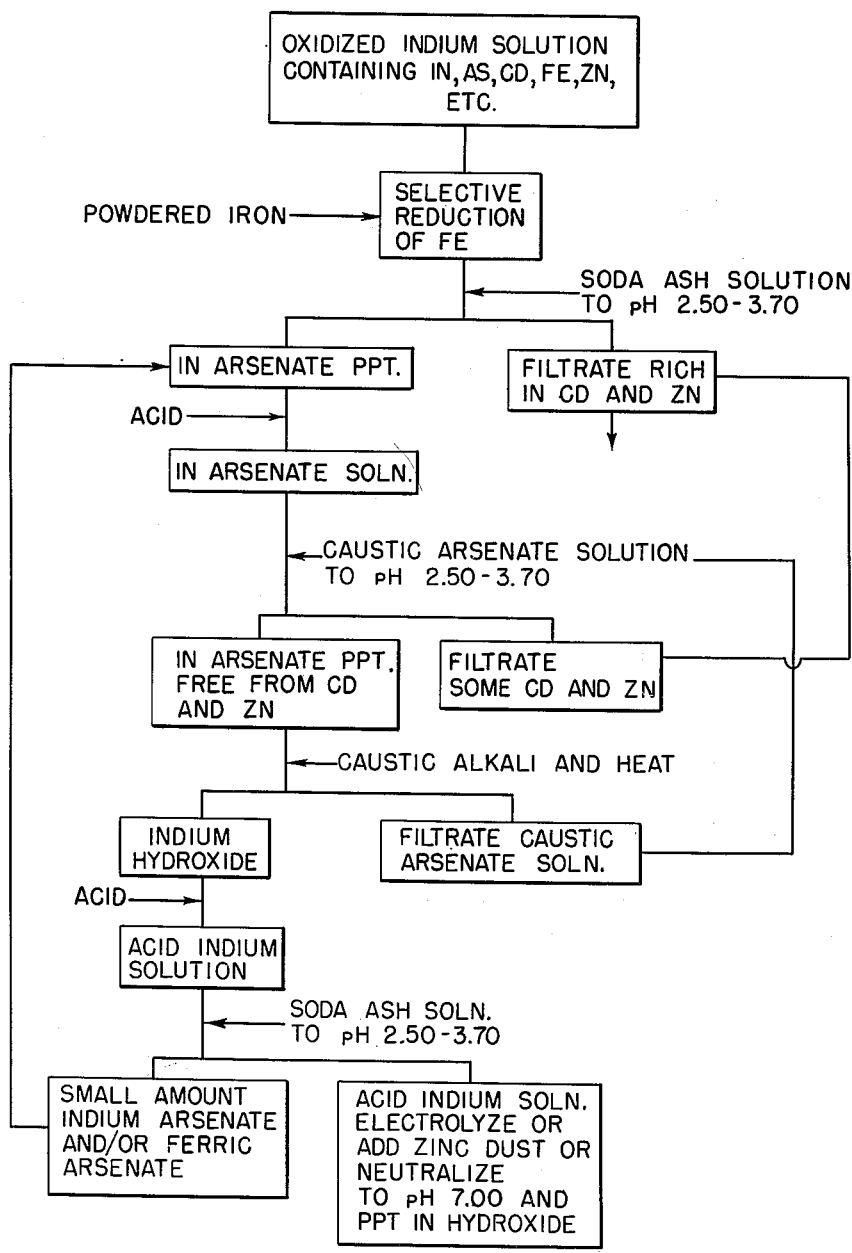
INVENTOR
JAMES L. HART
BY
Pennie, Edmonds, Morton, Barrows
ATTORNEYS Patented Feb. 19, 1952

2,586,649

UNITED STATES PATENT OFFICE 2,586,649

RECOVERY OF INDIUM VALUES AS INDIUM ARSENATE

James L. Hart, Bartlesville, Okla., assignor to National Zinc Company, Inc., New York, N. Y., a corporation of New York Application February 4, 1948, Serial No. 6,259

6 Claims. (Cl. 23—53)

This invention relates to the recovery of indium, and has for its object the provision of an improved method of indium recovery.

Indium occurs as a minor constituent of certain zinciferous ores, such, for example, as complex lead-zinc ores. Upon roasting such ores (or concentrates produced therefrom), the indium passes into the fume together with cadmium, zinc, lead, arsenic and other components. In the usual method of indium recovery, an acid solution of the indium is eventually achieved, which contains relatively large amounts of cadmium, zinc, arsenic and iron, so one faces the problem of separating a small amount of indium from these other components.

I have discovered that at the proper hydrogen ion concentration soluble arsenates will precipitate indium to the substantial exclusion of such elements in solution as cadmium, zinc and ferrous iron. Based on that discovery the present invention, in its broad aspect, involves adjusting the pH value of the solution to between 2.50 and 3.70 in the presence of a soluble arsenate and thereby selectively precipitating the indium as indium arsenate. The acid solution containing indium is prepared by leaching the indium-containing material (such as flue dust from a zinc ore roasting operation) with an acid, such as sulphuric, hydrochloric, nitric and the like. The resulting acid leach liquor contains practically all of the metal components in the flue dust (or the like) in the form of salts of whatever acid was used, and is highly acid, usually having a pH of less than 2.50. Since the selective precipitation of the indium depends upon the presence of a soluble arsenate in the solution, the presence of the arsenate must be assured. Most indium-containing materials will contain arsenic in adequate amount, but where there is no or insufficient arsenic present, arsenic in amount slightly in excess of that required to combine with all the indium as arsenate should be included in the acid indium solution.

The arsenic must be present in the form of arsenate, and to this end the acid indium solution should be subjected to an oxidizing treatment, which may consist of aeration or treatment with an oxidizing agent such as nitric acid, potassium permanganate, potassium chlorate, chlorine gas, etc. The oxidizing treatment will also oxidize the iron to the ferric state. The selectivity with respect to iron of the indium-arsenate reaction requires that the iron be present in the ferrous state, and therefore following the oxidizing treatment the solution is treated with powdered iron to reduce ferric iron to ferrous iron.

Following the oxidizing treatment to assure the presence of arsenic as arsenate (and the addition, if necessary, of a soluble arsenate to the solution), and the reduction of ferric iron to ferrous iron, the hydrogen ion concentration of the solution is adjusted within the range covered by pH values of 2.50 and 3.70. This is preferably accomplished by adding to the solution a solution of a weak alkali or base such for example as a solution of sodium carbonate or soda ash. Within this critical range of hydrogen ion concentration the indium arsenate is precipitated with little precipitation of cadmium, zinc, iron and other components likely to be present in the original acid indium solution. Substantially all of the indium is precipitated as the arsenate, and practically all of the other metals remain in solution. The precipitate is separated from the residual solution in any suitable manner, as by filtration, centrifuging, sedimentation and decantation, etc.

In order to recover the indium as metal, it is first necessary to convert the indium arsenate to indium hydroxide. This may be accomplished by treating the indium arsenate with an alkali hydroxide, such as caustic alkali, the reaction being accelerated by heating. For example, solid (flake) caustic soda may be added to the wet indium arsenate filter cake, say in the proportion of 2 pounds of caustic for each pound of contained indium. The moisture content of the cake is generally sufficient to give a slurry, which is brought to a boil, diluted to double its volume with water, and again brought to a boil. The resulting hot slurry is filtered, the indium hydroxide filter cake is washed, and the residual solution containing the alkali arsenate (e. g. sodium arsenate) may be used as a source of arsenate for selectively precipitating indium. Thus, the residual solution of alkali arsenate may advantageously be used in an intermediate purification treatment in which the first indium arsenate precipitate is redissolved in acid, the pH of the resulting solution adjusted to 2.50–3.70 by the addition of the caustic arsenate, and the resulting precipitate of indium arsenate free from cadmium and zinc then converted to indium hydroxide by treatment with caustic alkali and heat.

The indium hydroxide containing some iron and a small amount of arsenic may be purified by dissolving in an acid, such as hydrochloric or sulfuric, and adjusting the pH of the resulting acid solution to 2.50–3.70 by adding a soda ash solution and thereby precipitating a small amount of indium arsenate or ferric arsenate or both. The residual solution is predominantly the indium salt of the acid used for solution, and may be electrolyzed for the recovery of metallic indium, or treated with zinc dust to precipitate indium in the metallic state by metallic displacement. The residual indium salt solution may also be neutralized to a pH of 7.00 by the addition of sodium hydroxide, whereupon indium hydroxide is precipitated.

The selective nature of the indium precipitation by the process of the invention is well illustrated by the following example in which a chlorinated leach solution of Cottrell precipitator dust was treated. The single sheet of the accompanying drawing is a flow sheet of the procedure followed in this example and generally of the preferred practice of the invention.

The leach solution analyzed as follows: 2.21 g./l. indium, 1.87 g./l. iron, 8.69 g./l. cadmium, 21.8 g./l. zinc, and 1.07 g./l. arsenic. The arsenic and iron were in the oxidized state; i. e., ferric and arsenate ions. This solution was treated with powdered iron to selectively reduce ferric iron to ferrous iron and leave the arsenate for the indium precipitation. The solution was adjusted to a pH value of 3.56 by the addition of sodium carbonate solution. The well-stirred solution was filtered, and the indium arsenate filter cake was purified by resolution in acid, and reprecipitation as indium arsenate by the addition of a small amount of sodium arsenate solution. The precipitate of indium arsenate was substantially free of cadmium and zinc, and after separation from the residual solution (containing some cadmium and zinc) was treated with sodium hydroxide to convert the indium arsenate to indium hydroxide. The indium hydroxide was dissolved in acid, and this solution was oxidized and neutralized to a pH of 3.10 with caustic alkali and a small amount of ferric arsenate filtered out. The indium in the filtrate was precipitated as hydroxide by neutralization to a pH of 7.00. The indium hydroxide was filtered and ignited to the oxide. The final indium oxide analyzed as follows:

| | Percent |
|---|---|
| Indium | 69.82 |
| Arsenic | Nil |
| Cadmium | Nil |
| Zinc | Nil |
| Iron | 6.00 |
| Lead | 4.7 | and accounted for 100% of the indium in the original leach solution.

I claim:

1. The method of selectively precipitating indium values from an acid indium-bearing solution containing impurities and having a pH value of less than 2.5 which comprises adjusting the pH value of the solution to between 2.50 and 3.70 in the presence of a soluble arsenate and thereby selectively precipitating the indium as arsenate, and recovering the indium arsenate from the residual solution containing substantially all of the original impurities.

2. The method of recovering indium values from an acid solution containing dissolved compounds of indium, cadmium, and zinc together with a soluble arsenate, which comprises selectively precipitating the indium as arsenate by adjusting the acidity of the solution to a pH value of between 2.50 and 3.70, and recovering the indium arsenate from the residual solution containing most of the original cadmium and zinc.

3. The method of recovering indium values from an acid solution containing dissolved compounds of indium, arsenic and zinc which comprises subjecting the solution to oxidation to convert the dissolved arsenic to a soluble arsenate, adjusting the acidity of the solution to a pH value of between 2.50 and 3.70 and thereby selectively precipitating the indium as arsenate, and separating the indium arsenate from the residual solution.

4. The method of recovering indium values from an acid solution containing dissolved compounds of indium, iron, arsenic and zinc which comprises subjecting the solution to oxidation to convert the dissolved arsenic to a soluble arsenate, treating the oxidized solution with powdered iron to reduce ferric iron compounds in solution to ferrous iron compounds adjusting the acidity of the solution to a pH value of between 2.50 and 3.70 and thereby selectively precipitating the indium as arsenate, and separating the indium arsenate from the residual solution.

5. The method of recovering indium values from an acid solution containing dissolved compounds of indium and zinc which comprises adjusting the pH value of the solution to between 2.50 and 3.70 in the presence of a soluble arsenate and thereby selectively precipitating the indium as arsenate, separating the indium arsenate from the residual solution, dissolving the separated indium arsenate in an acid, treating the resulting acid solution with an alkali arsenate to adjust the pH value to between 2.50 and 3.70 and thereby precipitating the indium as arsenate, treating the precipitated indium arsenate with an alkali hydroxide and thereby converting the indium arsenate to indium hydroxide, dissolving the resulting indium hydroxide in an acid, and adjusting the pH value of the resulting acid solution to between 2.50 and 3.70 to precipitate any residual indium arsenate.

6. The method of recovering indium values from an acid solution containing dissolved compounds of indium, iron, arsenic and zinc which comprises subjecting the solution to oxidation to convert the dissolved arsenic to a soluble arsenate, treating the oxidized solution with powdered iron to reduce ferric iron compounds in solution to ferrous iron compounds, adjusting the acidity of the solution to a pH value of between 2.50 and 3.70 and thereby selectively precipitating the indium as arsenate, separating the indium arsenate from the residual solution, dissolving the separated indium arsenate in an acid, treating the resulting acid solution with an alkali arsenate to adjust the pH value to between 2.50 and 3.70 and thereby precipitating the indium as arsenate, treating the precipitated indium arsenate with an alkali hydroxide and thereby converting the indium arsenate to indium hydroxide, dissolving the resulting indium hydroxide in an acid, and adjusting the pH value of the resulting acid solution to between 2.50 and 3.70 to precipitate any residual indium arsenate and ferric arsenate.

JAMES L. HART.

REFERENCES CITED

The following references are of record in the file of this patent:

UNITED STATES PATENTS

| Number | Name | Date |
|---|---|---|
| 2,052,387 | Doran | Aug. 25, 1936 |
| 2,238,437 | Zischkau | Apr. 15, 1941 |
| 2,477,799 | Hart | Aug. 2, 1949 |

OTHER REFERENCES

Sebba et al.: "Transactions of the Royal Society of South Africa," vol. 25, pages 399–401 (1937–38).

Mellor: "Modern Inorganic Chemistry," page 672 (1939), published by Longmans, Green & Co., N. Y. C.